(12) United States Patent
Hoover

(10) Patent No.: US 10,752,134 B2
(45) Date of Patent: Aug. 25, 2020

(54) QUICK CONNECT COUPLER FOR A CHILD SAFETY SEAT TOP TETHER

(71) Applicant: BRITAX CHILD SAFETY, INC., Fort Mill, SC (US)

(72) Inventor: Brandon Cory Hoover, Cornelius, NC (US)

(73) Assignee: BRITAX CHILD SAFETY, INC., Fort Mill, SC (US)

( * ) Notice: Subject to any disclaimer, the term of this patent is extended or adjusted under 35 U.S.C. 154(b) by 0 days.

(21) Appl. No.: 16/134,233

(22) Filed: Sep. 18, 2018

(65) Prior Publication Data

US 2019/0084448 A1    Mar. 21, 2019

Related U.S. Application Data

(60) Provisional application No. 62/560,353, filed on Sep. 19, 2017.

(51) Int. Cl.
*B60N 2/28* (2006.01)

(52) U.S. Cl.
CPC ......... *B60N 2/2809* (2013.01); *B60N 2/2887* (2013.01)

(58) Field of Classification Search
CPC ............................. B60N 2/2809; B60N 2/2887
USPC ...................... 297/250.1, 253, 485
See application file for complete search history.

(56) References Cited

U.S. PATENT DOCUMENTS

| 3,922,035 A | * | 11/1975 | Wener | ..................... A47D 1/103 297/256.13 |
| 2002/0000744 A1 | * | 1/2002 | Maciejczyk | ......... B60N 2/2809 297/254 |

FOREIGN PATENT DOCUMENTS

DE            2712917 A1 *  9/1978  ........... B60N 2/2809

* cited by examiner

*Primary Examiner* — Milton Nelson, Jr.
(74) *Attorney, Agent, or Firm* — Burr & Forman, LLP

(57) ABSTRACT

A child safety seat may include a base portion configured to be disposed on a vehicle seat base of a vehicle seat, a back portion configured to be disposed proximate to a vehicle seat back of the vehicle seat, and a top tether operably coupled to a portion of the child safety seat to enable the child safety seat to be tethered to an anchor disposed in the vehicle. The top tether may include a quick connect coupler and a first strap portion having a distal end and a proximal end. The distal end of the first strap portion may be configured to engage the anchor. The quick connect coupler may be operably coupled to the first strap portion proximate to the proximal end of the first strap portion. The quick connect coupler may also be configured to enable the first strap portion to be coupled or decoupled from the back portion of the child safety seat.

15 Claims, 6 Drawing Sheets ical arrangements 30

QUICK CONNECT COUPLER FOR A CHILD SAFETY SEAT TOP TETHER

CROSS REFERENCE TO RELATED APPLICATION

This application claims priority to U.S. application No. 62/560,353 filed Sep. 19, 2017, the entire contents of which are hereby incorporated by reference in its entirety.

TECHNICAL FIELD

Exemplary embodiments of the present disclosure generally relate to child safety seats, and more particularly, to a quick connect coupler for a top tether of a child safety seat.

BACKGROUND

Child safety seats (or simply child seats or car seats) are secured inside a vehicle to protect children in vehicles from the effects of either accidents, sudden deceleration, or other impacts or jarring events. The child safety seats may include various different protective features relating to securing the child safety seats in the vehicle, securing the child to the child safety seat, and protecting the child once the child is secured in the child safety seat. Some of these protective features may be prescribed by regulation in certain jurisdictions, but others may provide optional, additional protection for children. Thus, child safety seats can have a variety of different features, and even different structural arrangements for providing many of those features.

Top tethers are a piece of equipment that can be useful for securing child safety seats within the vehicle, particularly for forward facing seats. The top tether is a strap that is attached to the top portion of the back of a forward facing child safety seat (or combination or convertible seat). The top tether may be attached to an anchor point at any of various locations within the vehicle and is then tightened between the top back of the child safety seat and the anchor point. The top tether may, when anchored properly, prevent movement of the back of the child safety seat forward during an impact or sudden deceleration. This can prevent a number of inches of forward movement of both the back of the child seat, and the head of the child, which can correspondingly reduce the likelihood of injury.

The anchor points can be different in different vehicles. Some anchor points are on the back of the seat to which the child safety seat is attached. However, other anchor points may be on the back wall of the vehicle, ceiling or frame of a rear door of the vehicle, rear shelf of the vehicle, a cargo floor of the vehicle, or under the back side of the seat to which the child safety seat is attached. Some of these anchor points may be relatively easy to find and connect to, but others may be difficult to connect to or find.

Compliance with attachment of the top tether is estimated to be less than 50%, and by some estimates far below 50%. This is, of course, an unfortunate statistic given the potential advantages of employing the top tether. Factors such as movement of the child safety seat between vehicles, familiarity with the locations of the anchor point, ease of access to the anchor point, etc., may contribute to this relatively low rate of employment. In a typical situation, the final attachment point for the top tether to the anchor point is done at the anchor point. Moreover, adjustment controls for the tightness of the tether are either located also at the anchor point, or at a separate location from the final attachment point (which is at the anchor point). Given that the anchor point is typically remote from the back of the child safety seat, the performance of final attachment and adjustment at either difficult to reach locations or separate locations tends to increase the potential for operators to find usage of the top tether to be inconvenient and therefore omit this important step. Additionally, when the installer is forced to work in tight spaces or from uncomfortable positions, the quality of the installation (e.g., the tension put on the top tether) may be reduced as well. Thus, it may be desirable to improve the ease of use of the top tether so that the rate of employment may be increased.

BRIEF SUMMARY OF SOME EXAMPLES

Some example embodiments may enable the provision of a quick connect coupler for the top tether for child safety seat installation. The quick connect coupler moves the attachment and adjustment points away from the anchor point and instead to a much more convenient location proximate to the back of the child safety seat. By collocating the final attachment point and the adjustment point proximate to the back of the child safety seat, it is hoped that usage may not only increase, but the quality of the install may also be increased.

In one example embodiment, a child safety seat is provided. The child safety seat may include a base portion configured to be disposed on a vehicle seat base of a vehicle seat, a back portion configured to be disposed proximate to a vehicle seat back of the vehicle seat, and a top tether operably coupled to a portion of the child safety seat to enable the child safety seat to be tethered to an anchor disposed in the vehicle. The top tether may include a quick connect coupler and a first strap portion having a distal end and a proximal end. The distal end of the first strap portion may be configured to engage the anchor. The quick connect coupler may be operably coupled to the first strap portion proximate to the proximal end of the first strap portion. The quick connect coupler may also be configured to enable the first strap portion to be coupled or decoupled from the back portion of the child safety seat.

In another example embodiment, a top tether for a child safety seat is provided. The child safety seat may include a base portion configured to be disposed on a vehicle seat base of a vehicle seat and a back portion configured to be disposed proximate to a vehicle seat back of the vehicle seat. The top tether may include a quick connect coupler and a first strap portion having a distal end and a proximal end. The top tether may be configured to enable the child safety seat to be tethered to an anchor disposed in the vehicle. The distal end of the first strap portion may be configured to engage the anchor. The quick connect coupler may be operably coupled to the first strap portion proximate to the proximal end of the first strap portion. The quick connect coupler may be configured to enable the first strap portion to be coupled or decoupled from the back portion of the child safety seat.

In another example embodiment, a method of attaching a top tether of a child safety seat to a vehicle is provided. The child safety seat may include a base portion configured to be disposed on a vehicle seat base of a vehicle seat and a back portion configured to be disposed proximate to a vehicle seat back of the vehicle seat. The top tether may include a quick connect coupler and a first strap portion having a distal end and a proximal end. The quick connect coupler may be operably coupled to the first strap portion proximate to the proximal end of the first strap portion. The method may include attaching the distal end of the first strap portion to an anchor disposed in the vehicle while a retaining portion of the quick connect coupler and an insertion portion of the quick connect coupler are decoupled from each other, and operably coupling the first strap portion to a top of the back portion of the child safety seat by attaching the retaining portion and the insertion portion to each other.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
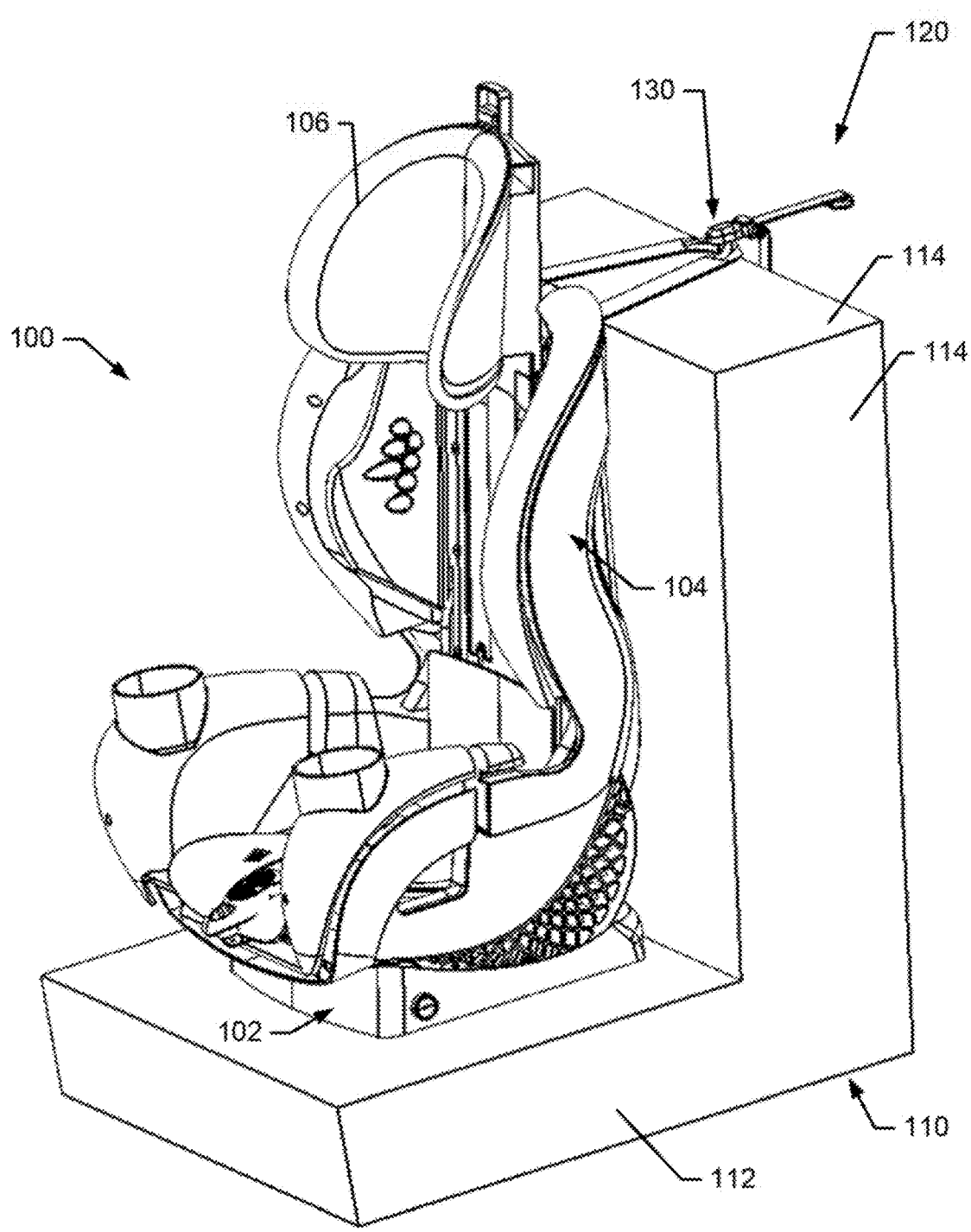
FIG. 1 illustrates a front side perspective view of a child safety seat employing a quick connect coupler in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As discussed above, the difficulty of providing a final connection point of the top tether to the anchor point and then tightening the same from a different position can reduce usage rates for the top tether and sacrifice safety. To improve usage rates, example embodiments may be configured to place both the final connection point for coupling and decoupling the top tether to the anchor point, and the adjustment mechanism for tightening the top tether at a convenient location.

Figure 2:
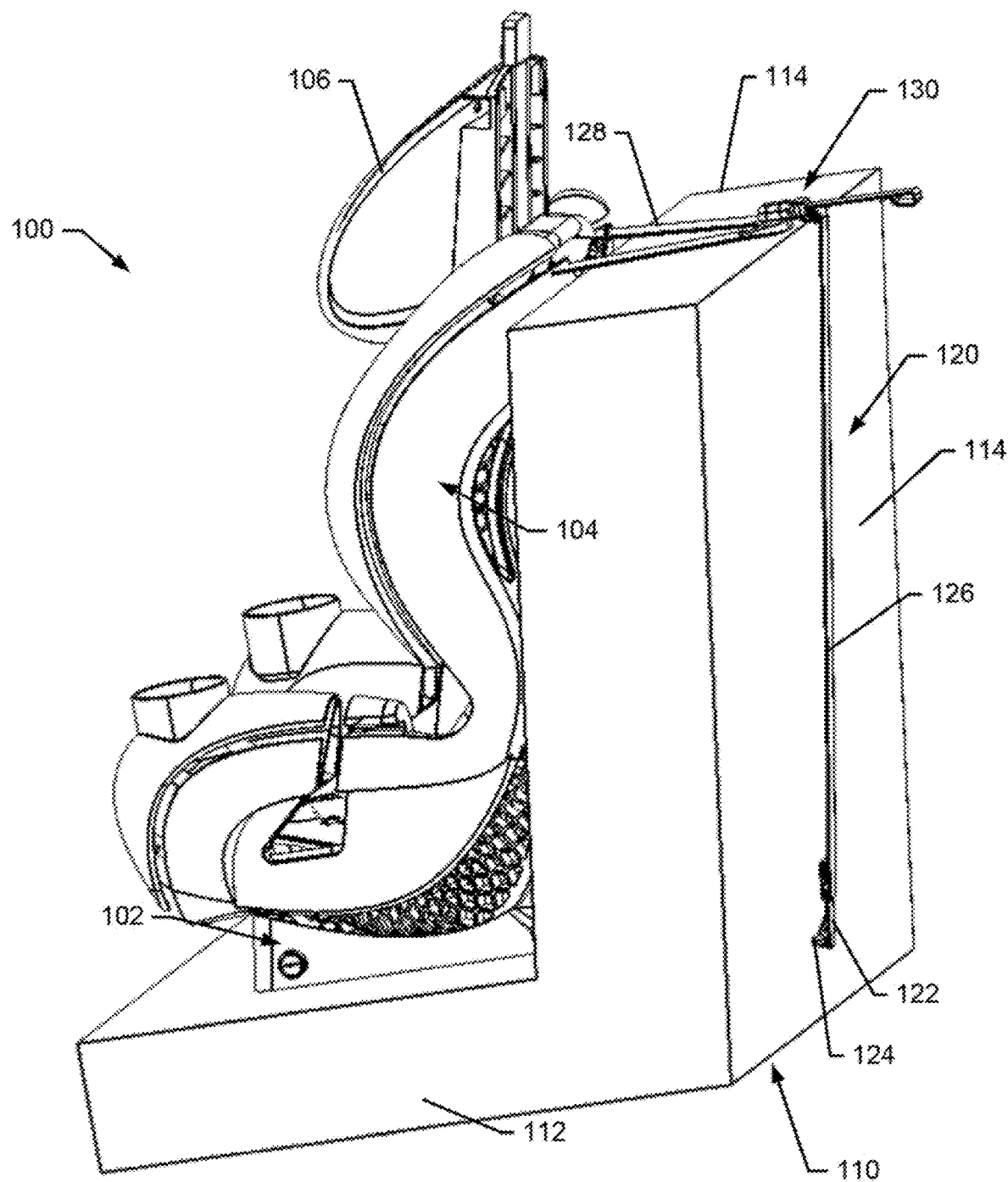
FIG. 2 illustrates a rear side perspective view of a child safety seat employing a quick connect coupler in accordance with an example embodiment.

A child safety seat 100 of an example embodiment is shown in FIGS. 1 and 2. The child safety seat 100 of FIGS. 1 and 2 happens to be a forward facing child safety seat with an extendible head rest. However, it should be appreciated that other structures for the child safety seat 100 may alternatively be employed including, for example, infant car seat models, convertible models, combination models, and/or the like, which may include various additional safety or convenience features. The arrangement and positions of various features, accessories and other structures may be altered in accordance with many such designs. Thus, the child safety seat 100 of FIGS. 1 and 2 should be appreciated as merely being one non-limiting example of a structure that may employ an example embodiment.

FIGS. 1 and 2 illustrate front and rear perspective side views of the child safety seat 100, which may employ a quick connect coupler in accordance with an example embodiment. Of note, the specific structures and arrangements of components that form the child safety seat 100, and the quick connect coupler of FIGS. 1 and 2 are merely exemplary of one type of arrangement that could employ an example embodiment. Thus, particularly the specific structures that are unrelated to the quick connect coupler of the child safety seat 100 should be appreciated as being merely exemplary and non-limiting.

As shown in FIGS. 1 and 2, the child safety seat 100 may include at least a base portion 102 and a back portion 104, and may be configured to be secured to a vehicle seat 110 of a vehicle. In some cases, additional features for enhancing safety or ease of use of the child safety seat 100 may also be employed in connection with either the base portion 102 or the back portion 104. For example, the head rest 106 may be included, and may be fixed or extendible. The child safety seat 100 may also include a harness or other retaining assembly for securely and comfortably securing the child within the child safety seat 100. Additionally, a latch system may be provided for securing the base portion 102 to vehicle latch anchors (e.g., between a vehicle seat base 112 and a vehicle seat back 114 of the vehicle seat 110). In some cases, a seat belt tensioning mechanism may be included to enable use of a vehicle seat belt as a means by which to secure the child safety seat 100 to the vehicle seat 110. Regardless of the other methods and structures that may be employed to secure the child safety seat 100 to the vehicle seat 110, a top tether 120 of an example embodiment may also be employed.

The top tether 120 may extend from a top of the back portion 104 of the child safety seat 100 and over a top 115 of the vehicle seat back 114 to terminate at an end hook 122 that is configured to engage an anchor 124 at a distal end of the top tether 120. Although the anchor 124 of the depicted embodiment is located on the back side of the vehicle seat back 114, it should be appreciated that the anchor 124 could alternatively be located at any of a number of other positions within the vehicle without departing from the spirit or scope of example embodiments. For example, as mentioned above, the anchor 124 could be disposed at the back wall of the vehicle, ceiling or frame of a rear door of the vehicle, rear shelf of the vehicle, a cargo floor of the vehicle, or under the back side of the vehicle seat 110. Thus, the top tether 120 may include a proximal end that is attached to the top of the back portion 104 of the child safety seat 100 to the distal end at which location the end hook 122 is disposed.

Figure 3:
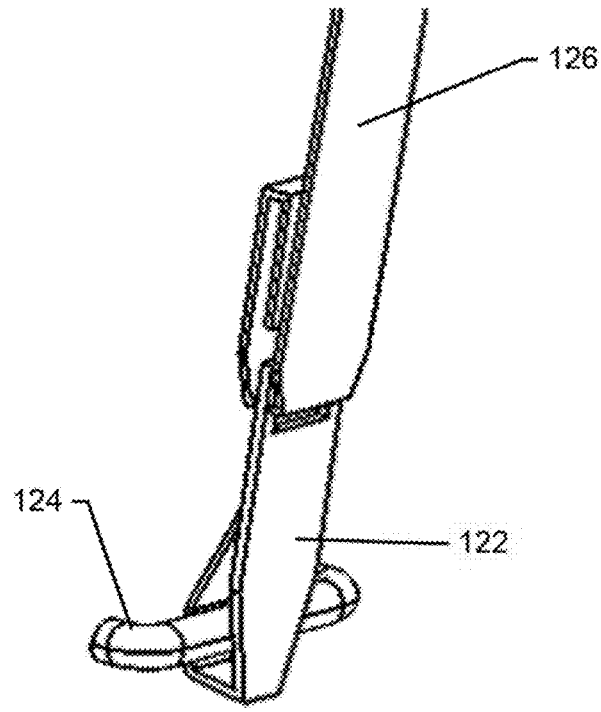
FIG. 3 illustrates a perspective view of an anchor point disposed at the back of a vehicle seat in accordance with an example embodiment.

The end hook 122 may, in some cases, be embodied as a snap hook, as shown in FIG. 3. The end hook 122 may include a slot for receiving a first strap portion 126 of the top tether 120. A distal end of the first strap portion 126 may be passed through the slot in the end hook 122 and sewed or otherwise affixed to itself or to the slot to prevent movement of the end hook 122 relative to the first strap portion 126. The first strap portion 126 may be made of webbing such as flat webbing made of synthetic fibers including nylon, polypropylene or polyester. The first strap portion 126 may extend from its distal end at the end hook 122 to be operably coupled to a second strap portion 128 via a quick connect coupler 130 of an example embodiment. The second strap portion 128 may also be made of flat webbing, and may extend from a proximal end thereof, which is affixed to the top of the back portion 104 of the child safety seat 100, to a distal end thereof, which is operably coupled to the quick connect coupler 130.

In an example embodiment, the quick connect coupler 130 may releasably couple the first and second strap portions 126 and 128 of the top tether 120 at a portion of the top tether 120 that is between the proximal and distal ends of the top tether 120. However, it is also possible that the quick connect coupler 130 could be directly attached to a portion of the child safety seat 100 (e.g., at the top of the back portion 104 thereof). In any case, the quick connect coupler 130 may be disposed at a portion of the top tether 120 that ensures that the quick connect coupler 130 remains proximate to (or directly on) the top 115 of the vehicle seat back 114. This positioning of the quick connect coupler 130 ensures that the quick connect coupler 130 is easily accessible to the installer of the child safety seat 100. Thus, the first strap portion 126 of the top tether 120 can be easily coupled to or decoupled from the child safety seat 100 via the quick connect coupler 130 by the installer.

Figure 4:
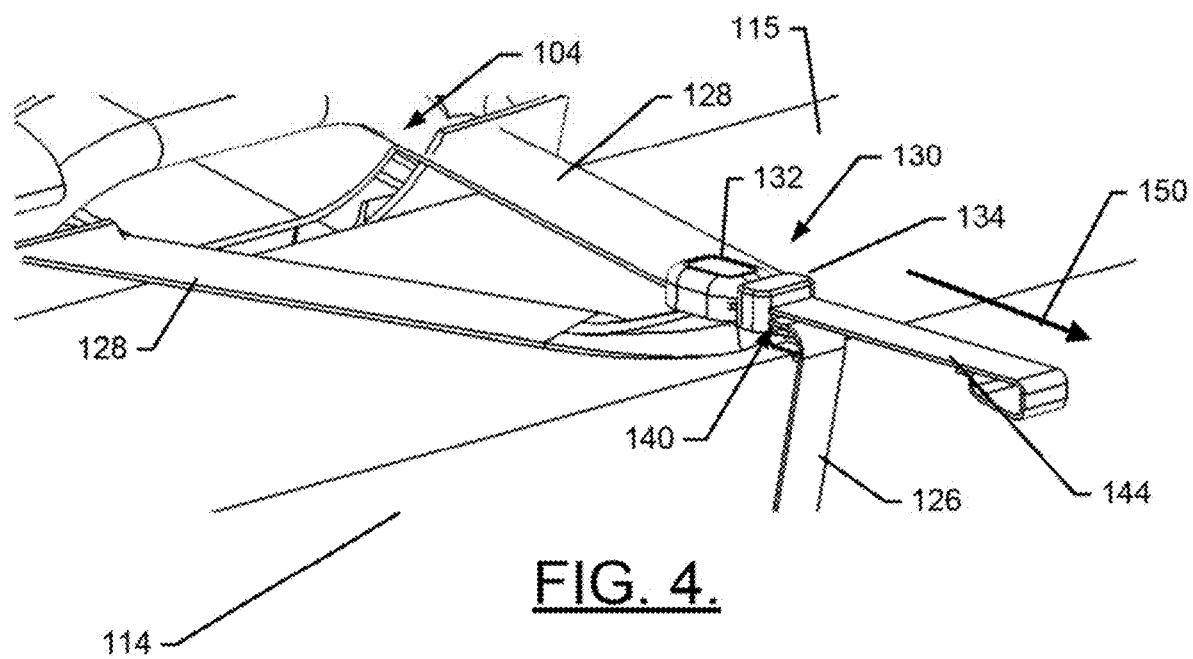
FIG. 4 illustrates a perspective view of the quick connect coupler to illustrate a tightening operation in accordance with an example embodiment.
Figure 5:
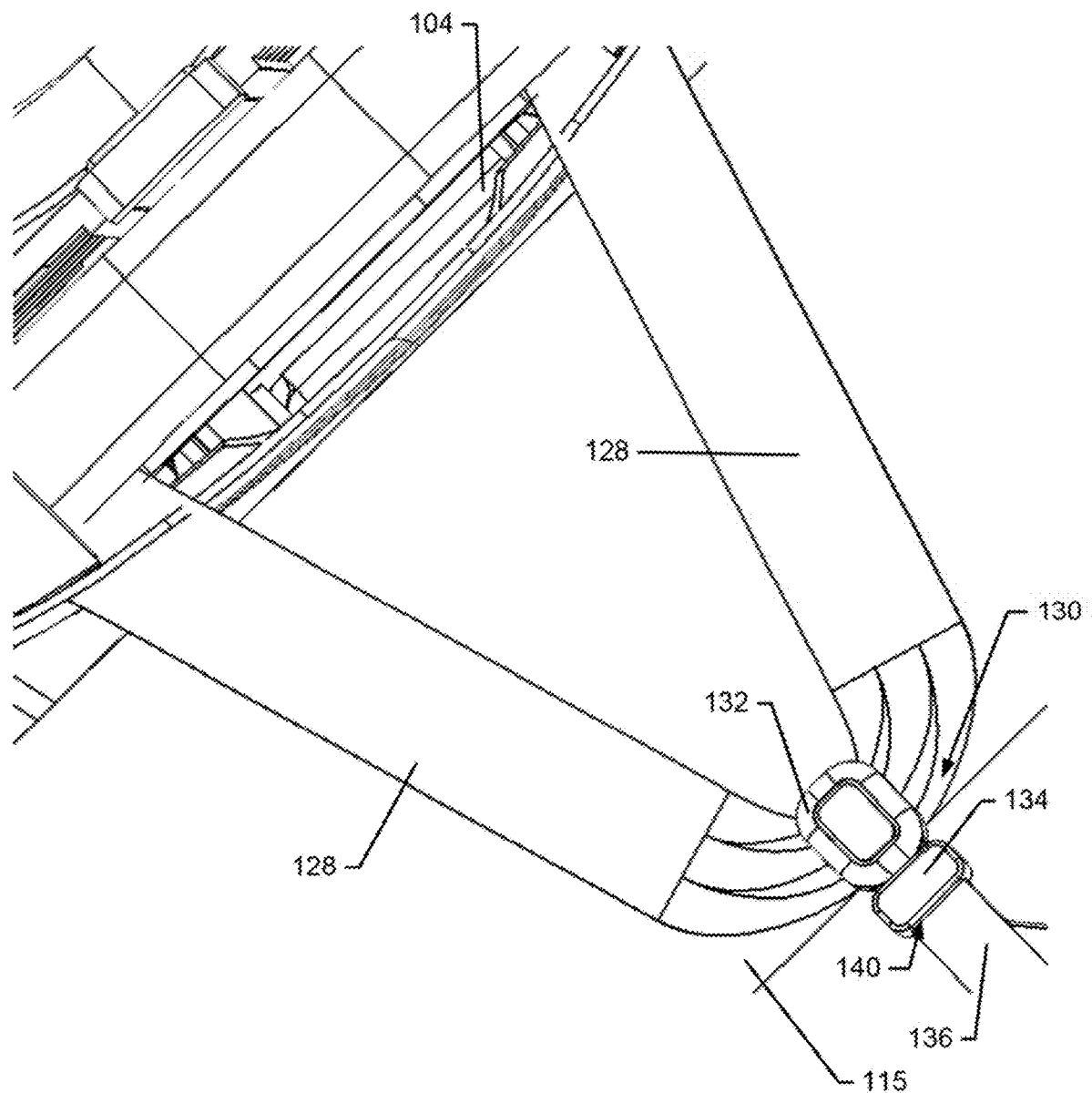
FIG. 5 illustrates a top view of the quick connect coupler in a connected state in accordance with an example embodiment.
Figure 6:
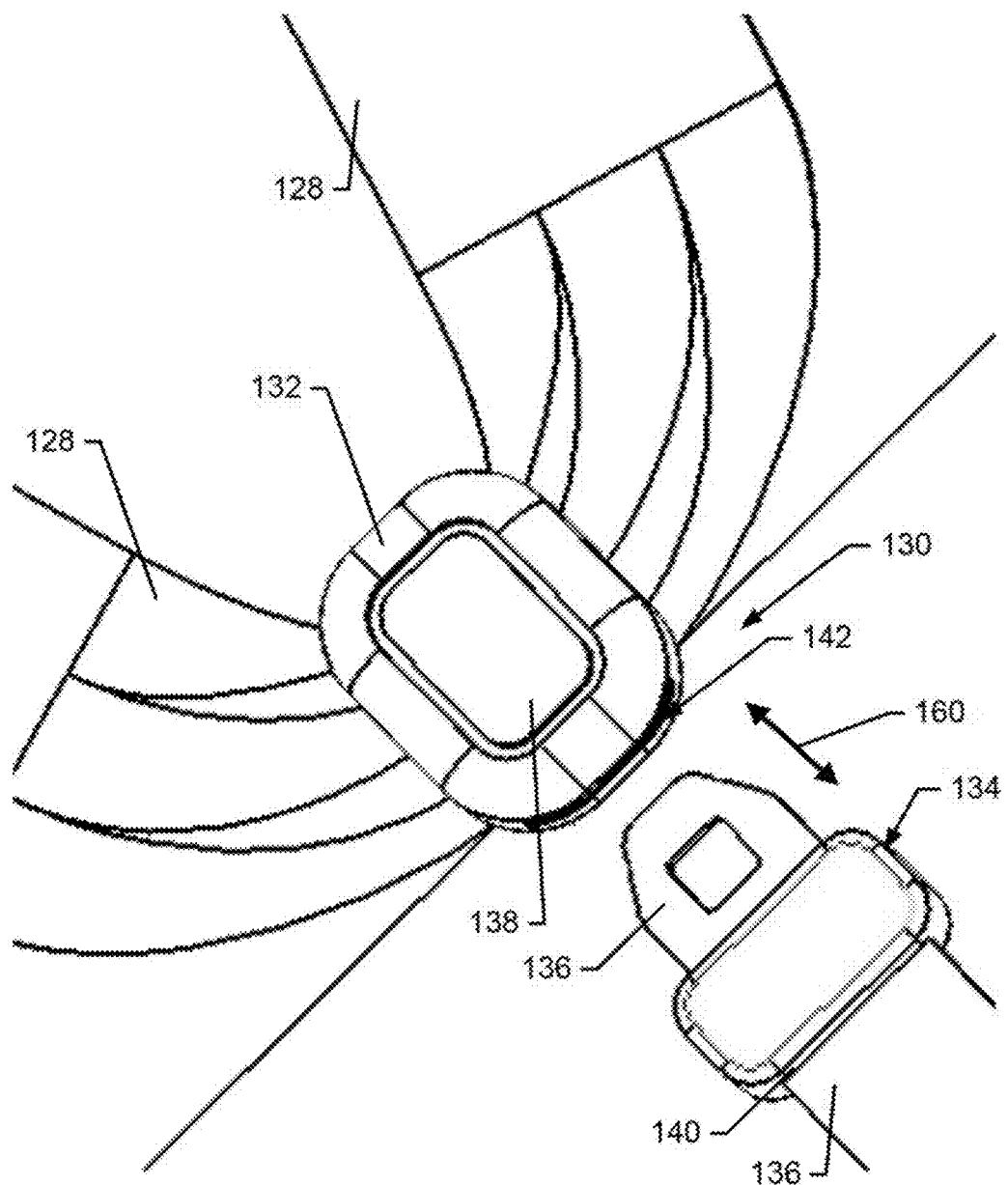
FIG. 6 illustrates a top view of the quick connect coupler in a disconnected state in accordance with an example embodiment.

The quick connect coupler 130, as shown in FIGS. 4, 5 and 6, may include a retaining portion 132 and an insertion portion 134 that is configured to be selectively retained in or released from the retaining portion 132. The quick connect coupler 130 may also include an adjustment assembly 140 that enables tightness of the first strap portion 126 (or the second strap portion 128) to be adjusted. The insertion portion 134 may include a tongue 136 that be similar to a seat belt buckle tongue, and may be retained in the retaining portion 132 by a latch assembly that may also be similar to a seat belt buckle latch assembly. In such an example, a release button 138 may be provided on the retaining portion 132 to release the latch assembly so that the tongue 136 of the insertion portion 134 is released. Meanwhile, the latch assembly may be spring loaded so that insertion of the tongue 136 into a slot 142 disposed at the retaining portion 132 may enable the latch assembly to engage and retain the tongue 136.

The second strap portion 128 may extend from the top of the back portion 104 of the child safety seat 100 to the retaining portion 132, and the first strap portion 126 may extend between the end hook 122 and the insertion portion 134. However, the locations of the retaining portion 132 and the insertion portion 134 could be reversed in some cases (e.g., so that the second strap portion 128 extends from the top of the back portion 104 of the child safety seat 100 to the insertion portion 134, and the first strap portion 126 extends between the end hook 122 and the retaining portion 132. In the example shown, the second strap portion 128 may be slidably engaged with the retaining portion 132 so that the position of the retaining portion 132 can move along the second strap portion 128 to further facilitate easy connection with the insertion portion 134 and correspondingly also coupling to the first strap portion 126. However, when the adjustment assembly 140 is used to adjust the tightness of the top tether 120, the retaining portion 132 may generally be expected to rest at a middle of the second strap portion 128. It should also be appreciated that the second strap portion 128 could merely connect to the child safety seat 100 at one point instead of at two points, or the second strap portion 128 could be eliminated entirely. Additionally, in some cases, the adjustment assembly 140 could operate to tighten the second strap portion 128 instead of the first strap portion 126.

As shown in FIGS. 4-6, the adjustment assembly 140 may be located at the insertion portion 134. For example, the adjustment assembly 140 may be operably coupled to the tongue 136 at a rear portion thereof. The proximal end of the first strap portion 126 may be passed through one or two slots of an adjuster clip or similar structure that may form the adjustment assembly 140. Thus, a loose end 144 of the first strap portion 126 may be pulled in the direction of arrow 150 to tighten the first strap portion 126 between the insertion portion 134 and the end hook 122. As such, both coupling and decoupling of the first strap portion 126 to the child safety seat 100 can be accomplished at the quick connect coupler 130 via operation of the release button 138 and movement of the insertion portion 134 in the directions of arrow 160 (see FIG. 6). Additionally, tensioning of the first strap portion 126 can be accomplished using the adjustment assembly 140 of the quick connect coupler 130.

As can be appreciated from FIGS. 4-6, in an example in which the quick connect coupler 130 rests on (or is proximate to) the top 115 of the vehicle seat back 114, the installer may be able to easily form the coupling between the first and second strap portions 126 and 128 and also adjust the tightness of the top tether 120 at the same, easy to reach, location. The first strap portion 126 may be affixed to the anchor 124 by placing the end hook 122 on the anchor 124 while the insertion portion 134 is disconnected from the retaining portion 132. Thus, finding the anchor 124 and connecting the end hook 122 to the anchor 124 may be accomplished without being tethered to and inhibited by the child safety seat 100. Once the end hook 122 has been attached to the anchor 124 (regardless of location of the anchor 124) and the child safety seat 100 is disposed properly on the vehicle seat 110, the retaining portion 134 will be at or near the top 115 of the vehicle seat back 114. The insertion portion 134 may then be coupled to the retaining portion 132 and tightening of the top tether 120 may be accomplished at the same location (i.e., at the quick connect coupler 130.

To decouple the top tether 120, the release button 138 may be depressed to allow the insertion portion 134 to be removed from the retaining portion 132 (e.g., by removal of the tongue 136 from the slot 142). When the tongue 136 is released, the first strap portion 126 may remain attached to the anchor 124 (via the end hook 122) such that a subsequent reattachment of the insertion portion 134 into the retaining portion 132 can easily be achieved at a later time in the manner described above. Alternatively, the end hook 122 could be removed from its connection to the anchor 124 to move the first strap portion 126 to another vehicle. However, even in an instance where the entire child safety seat 100 is to be moved, decoupling the retaining portion 132 from the insertion portion 134 may still make removal and subsequent installation of the first strap portion 126 at a later time easier since the first strap portion 126 is decoupled from the child safety seat 100. Thus, coupling, decoupling and tightening of the top tether 120 can all be achieved at one convenient location.

Figure 7:
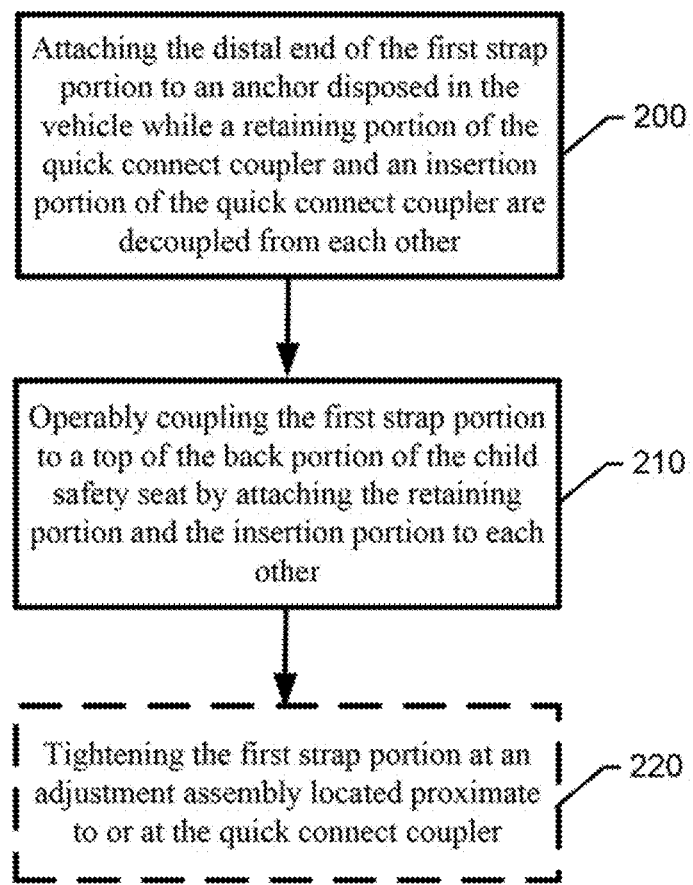
FIG. 7 illustrates a block diagram of a method of attaching a top tether of a child safety seat to a vehicle.

FIG. 7 illustrates a block diagram of a method of attaching a top tether of a child safety seat to a vehicle. In particular, the method is a method for attaching a two-piece top tether that is configured to have both opposite ends fixed to the child safety seat and vehicle anchor, respectively, before the two separate pieces of the top tether are joined together at a portion thereof that is between the opposite ends of the top tether. The method may include attaching the distal end of the first strap portion to an anchor disposed in the vehicle while a retaining portion of the quick connect coupler and an insertion portion of the quick connect coupler are decoupled from each other at operation 200. The method may further include operably coupling the first strap portion to a top of the back portion of the child safety seat by attaching the retaining portion and the insertion portion to each other at operation 210. The method of FIG. 7 may be modified or augmented in some cases. In this regard, in some cases a further optional step of tightening the first strap portion at an adjustment assembly located proximate to or at the quick connect coupler may also be included at operation 220.

Thus, according to an example embodiment, a child safety seat is provided. The child safety seat may include a base portion configured to be disposed on a vehicle seat base of a vehicle seat, a back portion configured to be disposed proximate to a vehicle seat back of the vehicle seat, and a top tether operably coupled to a portion of the child safety seat to enable the child safety seat to be tethered to an anchor disposed in the vehicle. The top tether may include a quick connect coupler and a first strap portion having a distal end and a proximal end. The distal end of the first strap portion may be configured to engage the anchor. The quick connect coupler may be operably coupled to the first strap portion proximate to the proximal end of the first strap portion. The quick connect coupler may also be configured to enable the first strap portion to be coupled or decoupled from the back portion of the child safety seat.

In some embodiments, the features described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the quick connect coupler may be further configured to enable tightening of the first strap portion when the first strap portion is coupled to the back portion of the child safety seat. In an example embodiment, the quick connect coupler may include a retaining portion and an insertion portion that is configured to be selectively retained in or released from the retaining portion. In some cases, the retaining portion may be disposed proximate to a top of the back portion. In some examples, the top tether may also include a second strap portion disposed between the retaining portion and the top of the back portion of the child safety seat. In an example embodiment, the quick connect coupler may also include an adjustment assembly disposed at the insertion portion to enable the tightening of the first strap portion. In some cases, when the insertion portion is retained at the retaining portion, the insertion portion, the retaining portion and the adjustment assembly may each be disposed on or proximate to a top of the vehicle seat back. In some examples, the adjustment assembly may include an adjuster clip. A loose end of the first strap portion may be pulled through the adjuster clip to tighten the first strap portion between the insertion portion and an end hook disposed at the distal end of the first strap portion. In an example embodiment, the retaining portion may include a latch assembly operable via a release button. The insertion portion may include a tongue configured to be retained by the latch assembly.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A child safety seat comprising:
   a base portion configured to be disposed on a vehicle seat base of a vehicle seat;
   a back portion configured to be disposed proximate to a vehicle seat back of the vehicle seat; and
   a top tether operably coupled to a portion of the child safety seat to enable the child safety seat to be tethered to an anchor disposed in the vehicle,
   wherein the top tether comprises a quick connect coupler and a first strap portion having a distal end and a proximal end,
   wherein the quick connect coupler comprises a retaining portion and an insertion portion that is configured to be selectively retained in or released from the retaining portion,
   wherein the retaining portion is disposed proximate to a top of the back portion of the child safety seat,
   wherein the distal end of the first strap portion is configured to engage the anchor,
   wherein the insertion portion of the quick connect coupler is operably coupled to the first strap portion proximate to the proximal end of the first strap portion,
   wherein the quick connect coupler is configured to enable the first strap portion to be coupled or decoupled from the back portion of the child safety seat, and
   wherein the top tether further comprises a second strap portion, the second strap portion having a proximal end and a distal end, wherein the distal end of the second strap portion is configured to be coupled to the retaining portion of the quick connect coupler and the proximal end of the second strap portion is configured to be coupled to the top of an exterior surface of the back portion of the child safety seat facing the vehicle seat back.

2. The child safety seat of claim 1, the child safety seat further comprises a harness configured to secure a child within the child safety seat.

3. The child safety seat of claim 1, wherein the retaining portion comprises a latch assembly operable via a release button, and wherein the insertion portion comprises a tongue configured to be retained by the latch assembly.

4. The child safety seat of claim 1, wherein the quick connect coupler is further configured to enable tightening of the first strap portion when the first strap portion is operably coupled to the top of the back portion of the child safety seat.

5. The child safety seat of claim 4, wherein the quick connect coupler further comprises an adjustment assembly disposed at the insertion portion to enable the tightening of the first strap portion.

6. The child safety seat of claim 5, wherein the adjustment assembly comprises an adjuster clip, and wherein a loose end of the first strap portion is pulled through the adjuster clip to tighten the first strap portion between the insertion portion and an end hook disposed at the distal end of the first strap portion.

7. The child safety seat of claim 5, wherein, when the insertion portion is retained at the retaining portion, the insertion portion, the retaining portion and the adjustment assembly are each disposed proximate to the top of the back portion of the child safety seat.

8. A method of attaching a top tether of a child safety seat to a vehicle, the child safety seat comprising a base portion configured to be disposed on a vehicle seat base of a vehicle seat and a back portion configured to be disposed proximate to a vehicle seat back of the vehicle seat, the top tether comprising a quick connect coupler, a first strap portion having a distal end and a proximal end, and a second strap portion having a distal end and proximal end, and the quick connect coupler comprising a retaining portion and an insertion portion that is configured to be selectively retained in or released from the retaining portion, the method comprising:
    attaching the distal end of the first strap portion to an anchor disposed in the vehicle while retaining portion of the quick connect coupler and the insertion portion of the quick connect coupler are decoupled from each other;
    operably coupling the proximal end of the first strap portion to the insertion portion of the quick connect coupler;
    attaching the proximal end of the second strap portion to a top of an exterior surface of the back portion of the child safety seat facing the vehicle seat back;
    operably coupling the distal end of the second strap portion to the retaining portion of the quick connect coupler; and
    attaching the retaining portion and the insertion portion to each other.

9. The method of claim 8, further comprising tightening the first strap portion at an adjustment assembly located proximate to or at the quick connect coupler.

10. A top tether for a child safety seat, the child safety seat comprising a base portion configured to be disposed on a vehicle seat base of a vehicle seat and a back portion configured to be disposed proximate to a vehicle seat back of the vehicle seat, the top tether comprising
    a quick connect coupler;
    a first strap portion having a distal end and a proximal end; and
    a second strap portion having a distal end and a proximal end,
    wherein the top tether is configured to enable the child safety seat to be tethered to an anchor disposed in the vehicle,
    wherein the quick connect coupler comprises a retaining portion and an insertion portion that is configured to be selectively retained in or released from the retaining portion,
    wherein the retaining portion is disposed proximate to a top of the back portion of the child safety seat,
    wherein the distal end of the first strap portion is configured to engage the anchor,
    wherein the insertion portion of the quick connect coupler is operably coupled to the first strap portion proximate to the proximal end of the first strap portion,
    wherein the quick connect coupler is configured to enable the first strap portion to be coupled or decoupled from the back portion of the child safety seat, and
    wherein the distal end of the second strap portion is configured to be coupled to the retaining portion of the quick connect coupler and the proximal end of the second strap portion is configured to be coupled to the top of an exterior surface of the back portion of the child safety seat facing the vehicle seat back.

11. The top tether of claim 10, wherein the quick connect coupler is further configured to enable tightening of the first strap portion when the first strap portion is operably coupled to the top of the back portion of the child safety seat.

12. The top tether of claim 10, wherein the retaining portion comprises a latch assembly operable via a release button, and wherein the insertion portion comprises a tongue configured to be retained by the latch assembly.

13. The top tether of claim 11, wherein the quick connect coupler further comprises an adjustment assembly disposed at the insertion portion to enable the tightening of the first strap portion.

14. The top tether of claim 13, wherein, when the insertion portion is retained at the retaining portion, the insertion portion, the retaining portion and the adjustment assembly are each proximate to the top of the back portion of the child safety seat.

15. The top tether of claim 13, wherein the adjustment assembly comprises an adjuster clip, and wherein a loose end of the first strap portion is pulled through the adjuster clip to tighten the first strap portion between the insertion portion and an end hook disposed at the distal end of the first strap portion.

* * * * *